United States Patent
Saha et al.

(10) Patent No.: US 10,977,164 B2
(45) Date of Patent: Apr. 13, 2021

(54) AUTOMATED GENERATION OF TEST CASES FOR ANALYZING NATURAL-LANGUAGE-INTERFACE-TO-DATABASE SYSTEMS

(71) Applicant: International Business Machines Corporation, Armonk, NY (US)

(72) Inventors: Diptikalyan Saha, Bangalore (IN); Jaydeep Sen, Bangalore (IN); Manasa Jammi, Bangalore (IN); Ashish Mittal, Bangalore (IN)

(73) Assignee: International Business Machines Corporation, Armonk, NY (US)

( * ) Notice: Subject to any disclaimer, the term of this patent is extended or adjusted under 35 U.S.C. 154(b) by 181 days.

(21) Appl. No.: 16/115,789

(22) Filed: Aug. 29, 2018

(65) Prior Publication Data

US 2020/0073787 A1 Mar. 5, 2020

(51) Int. Cl.
*G06F 16/00* (2019.01)
*G06F 11/36* (2006.01)
(Continued)

(52) U.S. Cl.
CPC ........ *G06F 11/3684* (2013.01); *G06F 16/243* (2019.01); *G06F 16/245* (2019.01); *G06F 40/30* (2020.01)

(58) Field of Classification Search
CPC ..... G06F 11/3684; G06F 16/243; G06F 40/30
See application file for complete search history.

(56) References Cited

U.S. PATENT DOCUMENTS 7,328,209 B2 * 2/2008 Das .................... G06F 16/2448
8,140,556 B2 * 3/2012 Rao ....................... G06F 16/242
707/759

(Continued)

OTHER PUBLICATIONS

Gordon et al., Evaluating a natural language interface for behavioral programming, Visual Languages and Human-Centric Computing (VL/HCC), IEEE Symposium, 2012.

(Continued)

*Primary Examiner* — Leslie Wong
(74) *Attorney, Agent, or Firm* — Ryan, Mason & Lewis, LLP

(57) ABSTRACT

Methods, systems, and computer program products for automated generation of test cases for analyzing natural-language-interface-to-database systems are provided herein. A computer-implemented method includes identifying sources of ambiguity from input to a natural-language-interface-to-database system and a precondition corresponding to each of the identified sources of ambiguity; generating test cases which analyze capabilities of the natural-language-interface-to-database system, wherein generating the one or more test cases includes determining validity of the preconditions within the context of the capabilities of the natural-language-interface-to-database system; automatically generating an ontology-dependent structured query template based at least in part on the generated test cases; automatically generating natural language queries based at least in part on the ontology-dependent structured query template; and outputting, to at least one user, the ontology-dependent structured query template and the natural language queries.

20 Claims, 5 Drawing Sheets

(51) Int. Cl.
*G06F 16/242* (2019.01)
*G06F 16/245* (2019.01)
*G06F 40/30* (2020.01)

(56) References Cited

U.S. PATENT DOCUMENTS

| | | | |
|---|---|---|---|
| 8,935,654 B2 | 1/2015 | Sengupta et al. | |
| 9,047,414 B1 | 6/2015 | Matyjek | |
| 9,342,556 B2 * | 5/2016 | Bhatia | G06F 16/24522 |
| 9,633,317 B2 | 4/2017 | Gabel et al. | |
| 9,959,311 B2 * | 5/2018 | Boguraev | G06F 40/247 |
| 10,169,336 B2 | 1/2019 | Mittal et al. | |
| 10,354,011 B2 * | 7/2019 | Nell | G06F 40/35 |
| 10,621,166 B2 * | 4/2020 | Mittal | G06F 40/30 |
| 10,664,472 B2 * | 5/2020 | Burceanu | G06F 16/24522 |
| 2006/0184468 A1 * | 8/2006 | Adir | G06F 11/3684 706/16 |
| 2010/0070448 A1 * | 3/2010 | Omoigui | H01L 27/14647 706/47 |
| 2012/0174069 A1 | 7/2012 | Zavatove | |
| 2016/0117360 A1 * | 4/2016 | Kunc | G06F 16/24573 707/730 |
| 2017/0026705 A1 * | 1/2017 | Yeh | G06F 16/3329 |
| 2017/0132115 A1 | 5/2017 | Misra et al. | |
| 2017/0154628 A1 | 6/2017 | Mohajer et al. | |
| 2018/0276273 A1 * | 9/2018 | Mittal | G06F 16/243 |
| 2018/0314689 A1 * | 11/2018 | Wang | G10L 15/22 |
| 2019/0303473 A1 * | 10/2019 | Sen | G06F 16/2425 |

OTHER PUBLICATIONS

Saha et al., Athena: An ontology-driven system for natural language querying over relational data stores, VLDB 2016.
Dale et al., The Realities of Generating Natural Language from Databases, Proceedings of the 11th Australian Joint Conference on Artificial Intelligence, 1998.

* cited by examiner

AUTOMATED GENERATION OF TEST CASES FOR ANALYZING NATURAL-LANGUAGE-INTERFACE-TO-DATABASE SYSTEMS

FIELD

The present application generally relates to information technology, and, more particularly, to language processing techniques.

BACKGROUND

Natural-language-interface-to-database (NLIDB) systems uses as input natural language questions and outputs structured queries. However, existing NLIDB-related approaches fail to include techniques for generating test cases for NLIDB testing, thereby limiting the accuracy and efficiency of such approaches.

SUMMARY

In one embodiment of the present invention, techniques for automated generation of test cases for analyzing natural-language-interface-to-database systems are provided. An exemplary computer-implemented method can include identifying (i) one or more sources of ambiguity from input to a natural-language-interface-to-database system and (ii) at least one precondition corresponding to each of the one or more identified sources of ambiguity, and generating one or more test cases which analyze one or more capabilities of the natural-language-interface-to-database system, wherein generating the one or more test cases comprises determining validity of the at least one precondition corresponding to each of the one or more identified sources of ambiguity within the context of the one or more capabilities of the natural-language-interface-to-database system. Such a method can also include automatically generating an ontology-dependent structured query template based at least in part on the one or more generated test cases and an ontology associated with the natural-language-interface-to-database system, and automatically generating one or more natural language queries based at least in part on the ontology-dependent structured query template and contents of at least one database associated with the natural-language-interface-to-database system. Further, such a method can include outputting, to at least one user, (i) the ontology-dependent structured query template and (ii) the one or more natural language queries.

In another embodiment of the invention, an exemplary computer-implemented method can include identifying (i) one or more ambiguous queries from input to a natural-language-interface-to-database system and (ii) at least one precondition corresponding to each of the one or more ambiguous queries, wherein each precondition represents an instance wherein one or more portions of a phrase from an ambiguous query can be associated with multiple properties in an ontology associated with the natural-language-interface-to-database system. Such a method can also include generating one or more test cases which analyze one or more capabilities of the natural-language-interface-to-database system, wherein said generating the one or more test cases comprises determining validity of the at least one precondition corresponding to each of the one or more ambiguous queries within the context of the one or more capabilities of the natural-language-interface-to-database system.

Another embodiment of the invention or elements thereof can be implemented in the form of a computer program product tangibly embodying computer readable instructions which, when implemented, cause a computer to carry out a plurality of method steps, as described herein. Furthermore, another embodiment of the invention or elements thereof can be implemented in the form of a system including a memory and at least one processor that is coupled to the memory and configured to perform noted method steps. Yet further, another embodiment of the invention or elements thereof can be implemented in the form of means for carrying out the method steps described herein, or elements thereof; the means can include hardware module(s) or a combination of hardware and software modules, wherein the software modules are stored in a tangible computer-readable storage medium (or multiple such media).

These and other objects, features and advantages of the present invention will become apparent from the following detailed description of illustrative embodiments thereof, which is to be read in connection with the accompanying drawings.

DETAILED DESCRIPTION

Figure 1:
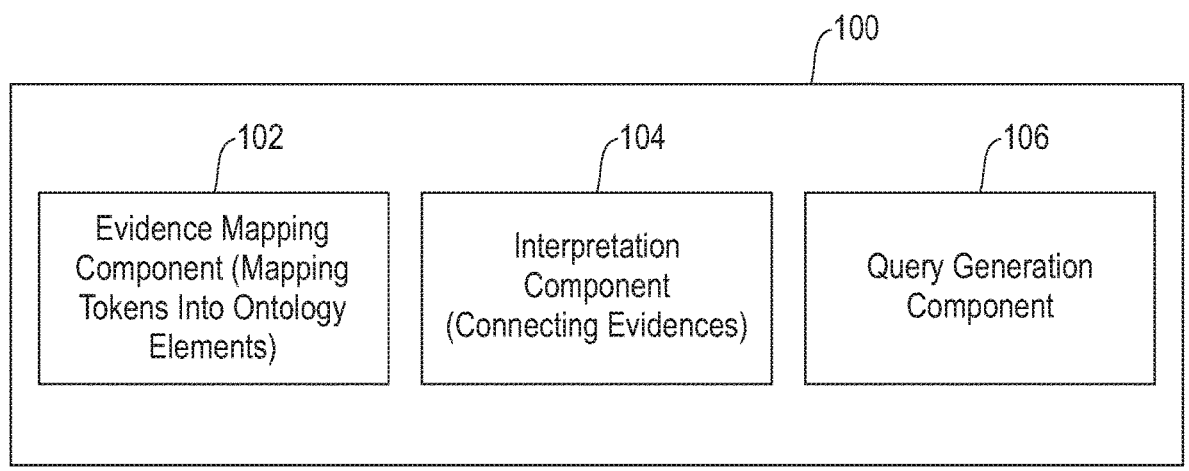
FIG. 1 is a diagram illustrating system architecture, according to an exemplary embodiment of the invention.

As described herein, an embodiment of the present invention includes automated generation of test cases for analyzing natural-language-interface-to-database systems. In one or more embodiments of the invention, the generated test cases can be used to test the ability of the NLIDB systems with respect to analyses such as query ambiguity analysis, natural language query input analysis, query meaning analysis, etc. Accordingly, at least one embodiment of the invention includes automatically identifying one or more ambiguity sources in input (schema input, vocabulary input, data input, etc.), and creating one or more test cases which exploit such ambiguities to test various capabilities of one or more NLIDB systems. Such an embodiment can also include generating an ontology-dependent structured query template and instantiating ontology element placeholders in the query with ontology elements corresponding to each ambiguous source.

As noted above, NLIDB systems can take, as input, a natural language question or query and output a structured query (for example, a structured query language (SQL) query). As detailed herein, one or more embodiments of the invention include automating test case generation, wherein each test case contains a natural language query and corresponding structured language query (for example, SQL, SPARQL, etc.). An objective of such test cases includes testing various abilities of NLIDB systems. Such abilities can include, for example, the ability to parse natural language tokens, phrases, synonyms, ordering of phases, as well as the ability to interpret query meanings correctly (that is, disambiguation ability).

In one or more embodiments of the invention, system input can include ontology and/or domain schema, domain vocabulary (including synonyms), data, and an NLIDB system to test. In this context, such data can include any information that is stored in databases, data stores, or any other information-preserving application. Additionally, the output generated by such a system can include test cases, which can include one or more natural language question-structured query pair, based on a relevant/particular database type.

At least one such embodiment of the invention includes identifying one or more ambiguity sources, wherein each ambiguity source has a precondition. By way merely of illustration, for an ambiguous query, a precondition is when parts of a phrase can be associated with multiple properties in the domain and/or ontology. Additionally, a precondition can also arise when data values are a sub-string of each other. Such an embodiment as noted above can also include performing one or more ambiguity analyses to determine if the precondition of an ambiguity source holds or not (that is, such preconditions are checked to determine if they are satisfied in the current domain context). Such ambiguity analyses can include, for example, an ambiguity analysis in connection with ontology, an ambiguity analysis in connection with data, and/or an ambiguity analysis in connection with vocabulary.

One or more embodiments of the invention additionally include database and/or data store-type independent query generation. In such an embodiment, one or more ontology-dependent structured query templates can be generated based on one or more given ontologies. For example, value-based instantiation of templates can be implemented to generate an ontology query language (OQL), an intermediate language which is storage-independent, and which operates over ontology concepts, properties and relations. Further, at least one embodiment of the invention can include writing and/or implementing one or more translators to translate OQL to one or more other query languages.

Accordingly, in one or more embodiments of the invention, query translation can be carried out to generate a database and/or data store-specific query. Such a translation can include a translation from OQL to SQL and/or SPAR-SQL. Based at least in part on such a translated query, one or more embodiments of the invention can include generating a natural language query.

FIG. 1 is a diagram illustrating system architecture, according to an embodiment of the invention. By way of illustration, FIG. 1 depicts system 100, which includes an evidence mapping component 102, an interpretation component 104, and a query generation component 106. As detailed herein, system 100 (which can be referred to as a natural language query (NLQ) engine, for example), can identify one or more instances where, corresponding to one natural language question, multiple OQLs can be potentially generated. Additionally, one or more embodiments of the invention can include creating test cases categorizing difference choices that can occur in different phases of NLQ processing. Formally, each ambiguous source can be represented as a precondition and two or more OQL query templates (examples of which are detailed further herein).

Referring again to FIG. 1, the evidence mapping component 102, which maps tokens into ontology elements, considers head phrases versus ontology elements and aggregation, how to match phrases (longer versus shorter matches, for example), index matches (value matches), metadata (ontology element) matches, and/or implicit matches (time and/or sentiment), boundaries of nested queries, implicit versus explicit relationships, relationship versus concept and/or property mapping, etc. As used herein, "head phrases" are typically the beginning of the questions which describe the type of information that is desired. For example, consider the head phrase of "what is," wherein the corresponding answer requires a description; consider the head phrase of "what is the count of," wherein the corresponding answer requires a count; and consider the head phrase of "why," wherein the corresponding answer requires a reasoning. As also noted above, "evidence mapping," as used herein, refers to a process wherein tokens and/or words in the queries are mapped to the domain ontology. This mapping can be dictionary-based and/or machine learning-based, and an objective of such mapping is to map the words as closely and correctly to domain terms represented through the ontology.

Additionally, the interpretation component 104, which connects evidences, can consider multiple matches of a token, multiple paths to connect tokens, and/or multiple same and/or similarly-ranked interpretations. Additionally, the interpretation component 104 assigns syntactic and semantic structure to the tokens/words present in the query based on the linguistics features of the query with respect to the domain represented via the ontology. This syntactic and semantic representation can be, for example, a formal representation of the query words. Further, the query generation component 106 can make selection determinations (such as, for example, all fields or only relevant fields), determine overlapping or non-overlapping paths, determine predicates such as and/or, more than/decreased by, etc., as well as determine group-by or order-by qualifications. As used above, "paths" refer to the edges in the domain that connect different concepts in the ontology. There can be more than one path that connects two concepts, and each of the paths can have a unique meaning associated therewith in connection with the ontology.

As noted above, the interpretation component 104 provides a formal representation of the query with valid syntactic and semantic structure based on the domain/ontology. To obtain the result, this representation is to be translated to a query language of the underlying data storage (for example, an SQL query in the case of a relational data store). Additionally, using an SQL query example, SQL query syntax offers predicates including "Group By," which is a statement in SQL used to arrange identical data into groups with the help of one or more functions (for example, if a column has the same values in different rows, then the "Group By" predicate will arrange these rows in a group). SQL query syntax also offers predicates including "Order By," a statement which arranges the result in ascending or descending order based on the column over which ordering is applied.

As detailed herein, one or more embodiments of the invention include generating ontology-independent structured query templates, such as, for example, from OQL grammar. Example templates can include, by way merely of illustration, the following:

SELECT o.{{C1_P1}} FROM {{C1}} o;
SELECT o.{{C1_P1}}, o.{{C1_P2}} FROM {{C1}};
SELECT count (o.{{C1_P1}}) FROM {{C1}}o;
SELECT min (o.{{C1_INTAGGR_P1}}) FROM {{C1}}o; and SELECT o2.{{C11_P1}}, o3.{{C12_P1}} FROM {{C1}} o1, {{C11}} o2, {{C12}} o3 WHERE o1->{{PATH_C1_C11}}=o2 AND o1->{{PATH_C1_C12}}=o3.

In the above-noted templates, the notations used therein (and elsewhere herein) include the following: "o" represents the object of table instantiated by {{C1}}; C refers to concept; C_P refers to the property P of concept C; C_IN-TAGGR_P1 refers to the integer property P of concept C; and PATH_C1_C11 refers to the path between concepts C1 and C11.

By way of additional illustration, examples of ambiguity sources and how such ambiguity sources are used by an example embodiment of the invention for test case generation are detailed below. For instance, in a first example, an ambiguity description can include head phrase versus ontology element and aggregation, and a precondition can include: C_P is "number of X" and C1_P1 is "X." Query templates in such an example can include "Select o.{{C_P}} from {{C}} o" and "Select count(o.{{C1_P1}}) from {{C1}} o." Further, an example NLQ generated by an example embodiment of the invention can include a query pertaining to counting persons, and related choices can include whether the "number of persons" will be in the select clause or count aggregate function applied on the person field.

A second example can, for instances, pertain to disambiguating paths connecting two concepts. In such an example, the precondition can include "Len (PATH1_C1_C2)=Len(PATH2_C1_C2)," wherein "Len" represents "length," and the related OQLs can include "select o.{{C1_P1}}, o2.{{C2_P1}} from {{C1}} o, {{C2}} o2 where o1->PATH_C1_C2=o2."

In performing an ambiguity analysis, one or more embodiments of the invention include, as detailed herein, checking a precondition in connection with particular data, particular vocabulary, and/or a particular ontology. With respect to data, such an embodiment can include determining if two data values have the same variation. With respect to ontology, such an embodiment can include determining a sub-set of concepts which has multiple Steiner trees, and identifying a pair of concepts having multiple paths (of different lengths, so it will not be covered by the previous step). With respect to vocabulary, such an embodiment can include determining if two ontology elements have the same and/or a similar synonym, and identifying all data and ontology elements having a similar synonym.

Additionally, as noted herein, one or more embodiments of the invention include query generation, which can include ontology-dependent structured query template generation and instantiation of one or more ontology element placeholders in the query with ontology elements corresponding to each identified ambiguity source. Such steps can generate test cases having example outputs such as the following:

SELECT o.number_of_presons from person_statistics o; and
SELECT count(o.person_name) from person_details o.

Such an embodiment can also include value-based instantiation, wherein values from data are used to instantiate a template. By way of example, consider the following illustrative instances:

SELECT o.{{C_P}} from {{C}} o where o,{{C_P1}}={{C_P1_VAL1}};
SELECT o.address from person_details o where o.name="John Doe"; and
SELECT o.address from person_details o where o.name="John Smith".

In the example instances above, paragraph [0035] is a template and paragraphs [0036] and [0037] are instantiations of templates with values from the database.

Figure 2:
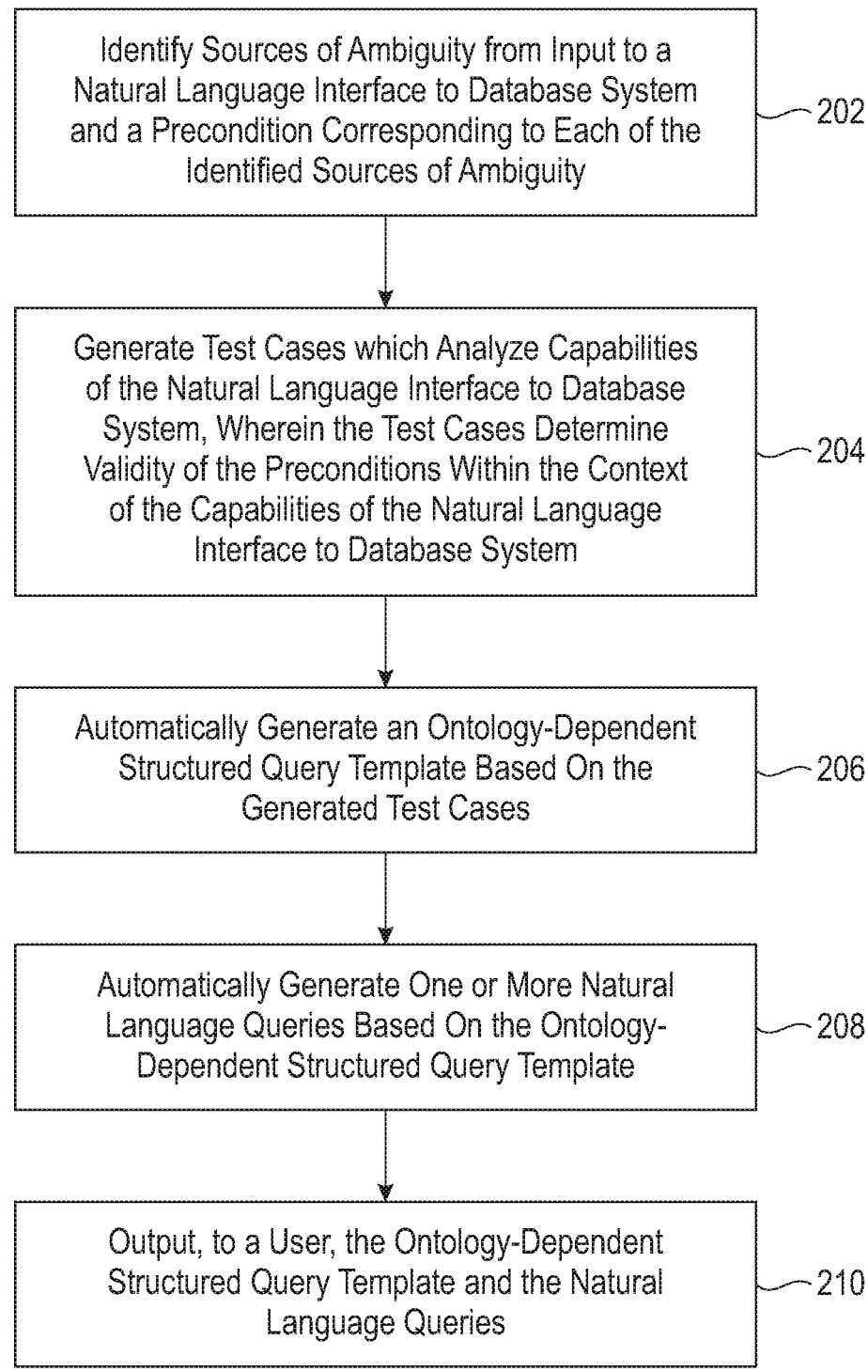
FIG. 2 is a flow diagram illustrating techniques according to an embodiment of the invention.

FIG. 2 is a flow diagram illustrating techniques according to an embodiment of the present invention. Step 202 includes identifying (i) one or more sources of ambiguity from input to a natural-language-interface-to-database system and (ii) at least one precondition corresponding to each of the one or more identified sources of ambiguity. The input can include, for example, schema input, vocabulary input and/or data input.

Step 204 includes generating one or more test cases which analyze one or more capabilities of the natural-language-interface-to-database system, wherein said generating the one or more test cases comprises determining validity of the at least one precondition corresponding to each of the one or more identified sources of ambiguity within the context of the one or more capabilities of the natural-language-interface-to-database system.

The one or more capabilities of the natural-language-interface-to-database system can include, for example, ambiguity analysis with respect to ontology, ambiguity analysis with respect to data, ambiguity analysis with respect to vocabulary, query ambiguity analysis, natural language query input analysis, and/or query meaning analysis.

Step 206 includes automatically generating an ontology-dependent structured query template based at least in part on (i) the one or more generated test cases and (ii) an ontology associated with the natural-language-interface-to-database system. The ontology-dependent structured query template can be database-type independent. Also, one or more embodiments of the invention include instantiating one or more ontology element placeholders in the ontology-dependent structured query template with one or more ontology elements corresponding to the one or more identified sources of ambiguity.

Step 208 includes automatically generating one or more natural language queries based at least in part on (i) the ontology-dependent structured query template and (ii) contents of at least one database associated with the natural-language-interface-to-database system. Each of the one or more natural language queries can be database-type dependent. Step 210 includes outputting, to at least one user, (i) the ontology-dependent structured query template and (ii) the one or more natural language queries.

Also, an additional embodiment of the invention includes identifying (i) one or more ambiguous queries from input to a natural-language-interface-to-database system and (ii) at least one precondition corresponding to each of the one or more ambiguous queries, wherein each precondition represents an instance wherein one or more portions of a phrase from an ambiguous query can be associated with multiple properties in an ontology associated with the natural-language-interface-to-database system. Such an embodiment can also include generating one or more test cases which analyze one or more capabilities of the natural-language-interface-to-database system, wherein said generating the one or more test cases comprises determining validity of the at least one precondition corresponding to each of the one or more ambiguous queries within the context of the one or more capabilities of the natural-language-interface-to-database system.

The techniques depicted in FIG. 2 can also, as described herein, include providing a system, wherein the system includes distinct software modules, each of the distinct software modules being embodied on a tangible computer-readable recordable storage medium. All of the modules (or any subset thereof) can be on the same medium, or each can be on a different medium, for example. The modules can include any or all of the components shown in the figures and/or described herein. In an embodiment of the invention, the modules can run, for example, on a hardware processor. The method steps can then be carried out using the distinct software modules of the system, as described above, executing on a hardware processor. Further, a computer program product can include a tangible computer-readable recordable storage medium with code adapted to be executed to carry out at least one method step described herein, including the provision of the system with the distinct software modules.

Additionally, the techniques depicted in FIG. 2 can be implemented via a computer program product that can include computer useable program code that is stored in a computer readable storage medium in a data processing system, and wherein the computer useable program code was downloaded over a network from a remote data processing system. Also, in an embodiment of the invention, the computer program product can include computer useable program code that is stored in a computer readable storage medium in a server data processing system, and wherein the computer useable program code is downloaded over a network to a remote data processing system for use in a computer readable storage medium with the remote system.

An embodiment of the invention or elements thereof can be implemented in the form of an apparatus including a memory and at least one processor that is coupled to the memory and configured to perform exemplary method steps.

Figure 3:
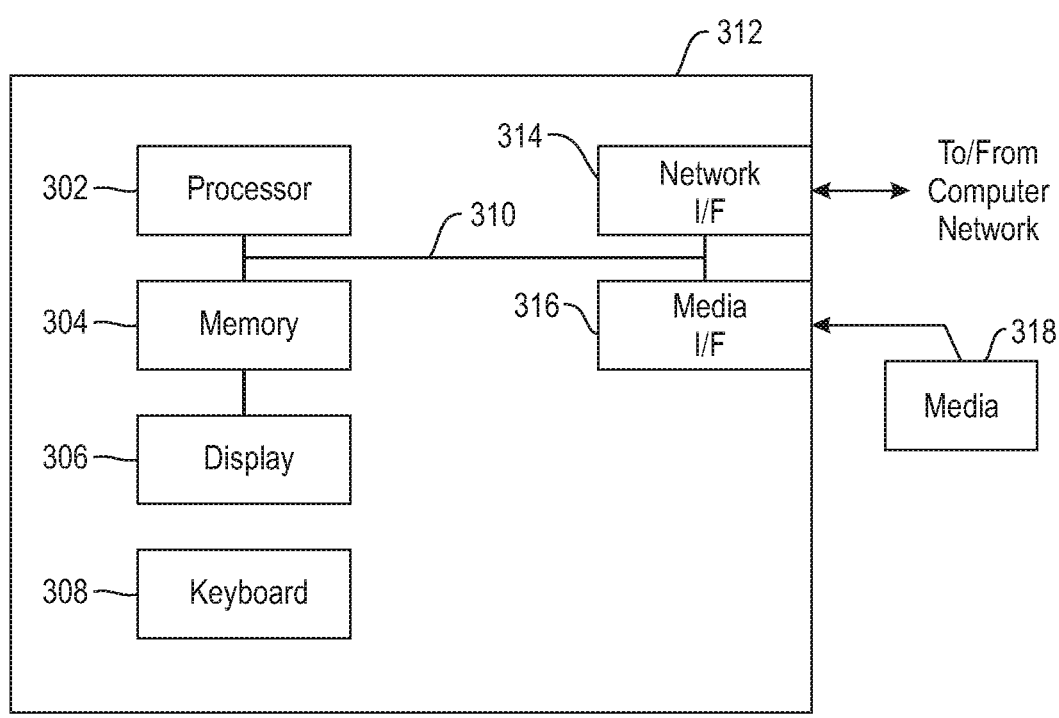
FIG. 3 is a system diagram of an exemplary computer system on which at least one embodiment of the invention can be implemented.

Additionally, an embodiment of the present invention can make use of software running on a computer or workstation. With reference to FIG. 3, such an implementation might employ, for example, a processor 302, a memory 304, and an input/output interface formed, for example, by a display 306 and a keyboard 308. The term "processor" as used herein is intended to include any processing device, such as, for example, one that includes a CPU (central processing unit) and/or other forms of processing circuitry. Further, the term "processor" may refer to more than one individual processor. The term "memory" is intended to include memory associated with a processor or CPU, such as, for example, RAM (random access memory), ROM (read only memory), a fixed memory device (for example, hard drive), a removable memory device (for example, diskette), a flash memory and the like. In addition, the phrase "input/output interface" as used herein, is intended to include, for example, a mechanism for inputting data to the processing unit (for example, mouse), and a mechanism for providing results associated with the processing unit (for example, printer). The processor 302, memory 304, and input/output interface such as display 306 and keyboard 308 can be interconnected, for example, via bus 310 as part of a data processing unit 312. Suitable interconnections, for example via bus 310, can also be provided to a network interface 314, such as a network card, which can be provided to interface with a computer network, and to a media interface 316, such as a diskette or CD-ROM drive, which can be provided to interface with media 318.

Accordingly, computer software including instructions or code for performing the methodologies of the invention, as described herein, may be stored in associated memory devices (for example, ROM, fixed or removable memory) and, when ready to be utilized, loaded in part or in whole (for example, into RAM) and implemented by a CPU. Such software could include, but is not limited to, firmware, resident software, microcode, and the like.

A data processing system suitable for storing and/or executing program code will include at least one processor 302 coupled directly or indirectly to memory elements 304 through a system bus 310. The memory elements can include local memory employed during actual implementation of the program code, bulk storage, and cache memories which provide temporary storage of at least some program code in order to reduce the number of times code must be retrieved from bulk storage during implementation.

Input/output or I/O devices (including, but not limited to, keyboards 308, displays 306, pointing devices, and the like) can be coupled to the system either directly (such as via bus 310) or through intervening I/O controllers (omitted for clarity).

Network adapters such as network interface 314 may also be coupled to the system to enable the data processing system to become coupled to other data processing systems or remote printers or storage devices through intervening private or public networks. Modems, cable modems and Ethernet cards are just a few of the currently available types of network adapters.

As used herein, including the claims, a "server" includes a physical data processing system (for example, system 312 as shown in FIG. 3) running a server program. It will be understood that such a physical server may or may not include a display and keyboard.

The present invention may be a system, a method, and/or a computer program product at any possible technical detail level of integration. The computer program product may include a computer readable storage medium (or media) having computer readable program instructions thereon for causing a processor to carry out embodiments of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform embodiments of the present invention.

Embodiments of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It should be noted that any of the methods described herein can include an additional step of providing a system comprising distinct software modules embodied on a computer readable storage medium; the modules can include, for example, any or all of the components detailed herein. The method steps can then be carried out using the distinct software modules and/or sub-modules of the system, as described above, executing on a hardware processor 302. Further, a computer program product can include a computer-readable storage medium with code adapted to be implemented to carry out at least one method step described herein, including the provision of the system with the distinct software modules.

In any case, it should be understood that the components illustrated herein may be implemented in various forms of hardware, software, or combinations thereof, for example, application specific integrated circuit(s) (ASICS), functional circuitry, an appropriately programmed digital computer with associated memory, and the like. Given the teachings of the invention provided herein, one of ordinary skill in the related art will be able to contemplate other implementations of the components of the invention.

Additionally, it is understood in advance that implementation of the teachings recited herein are not limited to a particular computing environment. Rather, embodiments of the present invention are capable of being implemented in conjunction with any type of computing environment now known or later developed.

For example, cloud computing is a model of service delivery for enabling convenient, on-demand network access to a shared pool of configurable computing resources (for example, networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (for example, country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (for example, storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (for example, web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (for example, host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (for example, mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (for example, cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Figure 4:
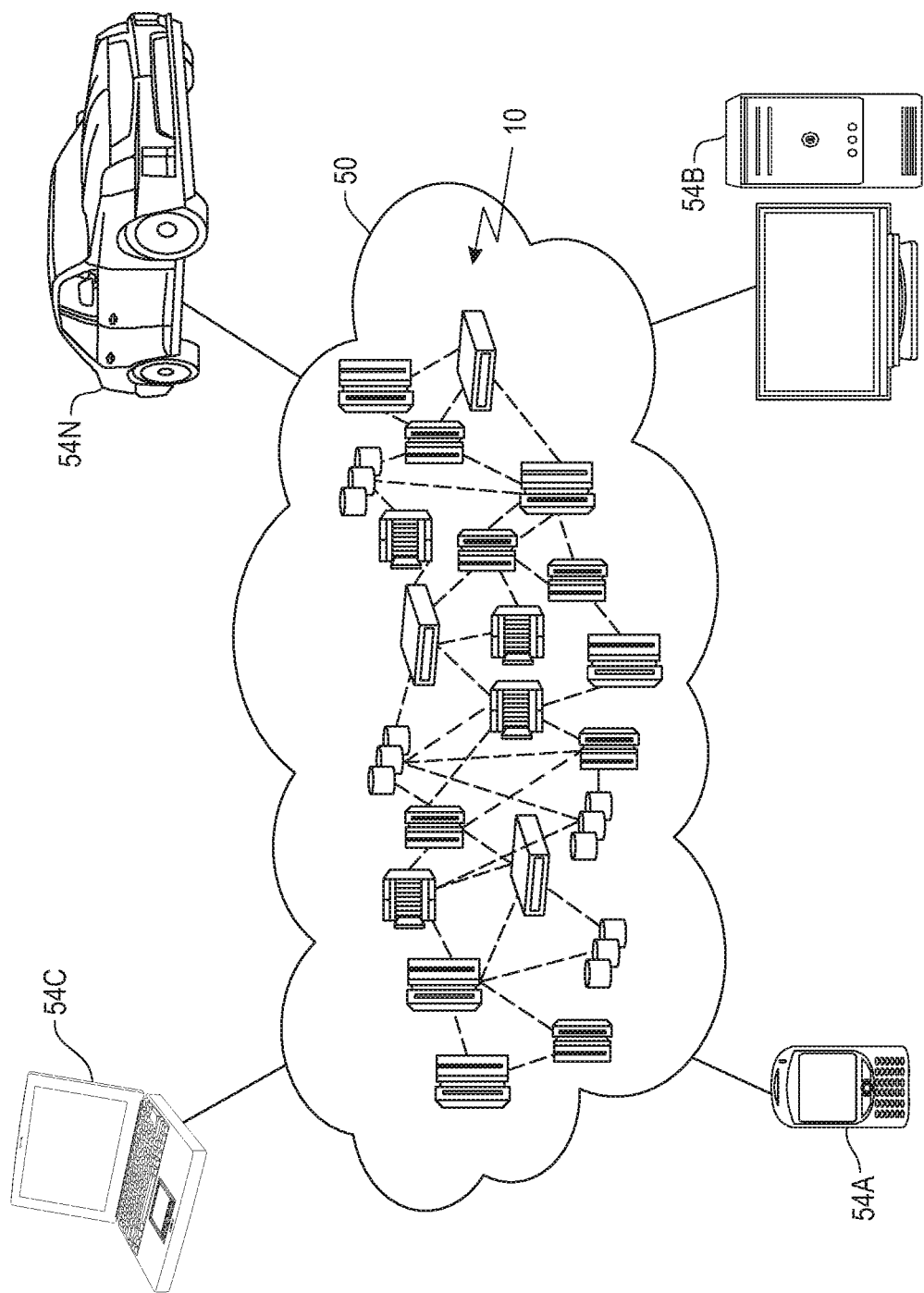
FIG. 4 depicts a cloud computing environment according to an embodiment of the present invention.

Referring now to FIG. 4, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 4 are intended to be illustrative only and that computing nodes 10 and cloud computing environment 50 can communicate with any type of computerized device over any type of network and/or network addressable connection (e.g., using a web browser).

Figure 5:
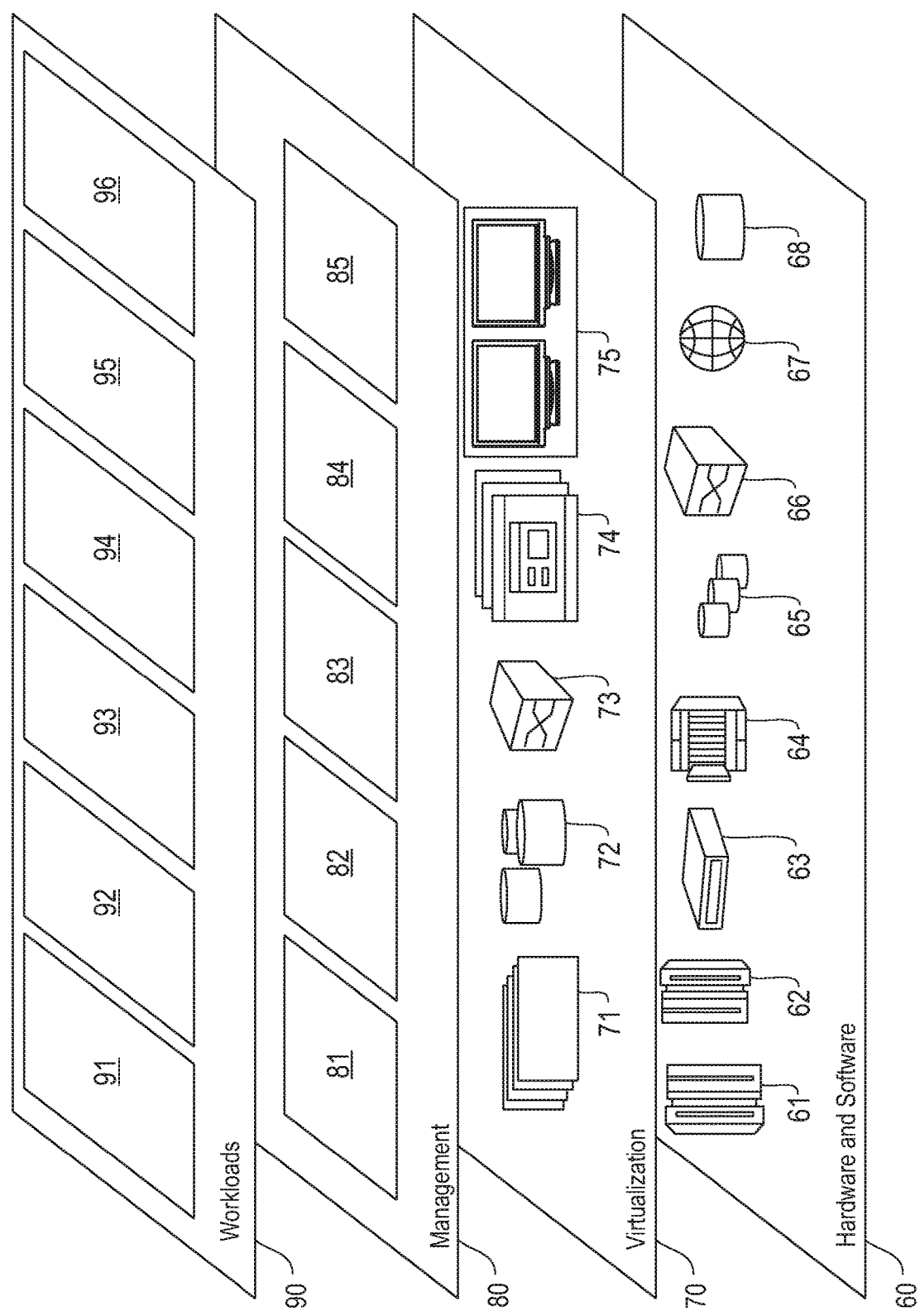
FIG. 5 depicts abstraction model layers according to an embodiment of the present invention.

Referring now to FIG. 5, a set of functional abstraction layers provided by cloud computing environment 50 (FIG. 4) is shown. It should be understood in advance that the components, layers, and functions shown in FIG. 5 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75. In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources.

In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and test case generation for analyzing NLIDB systems 96, in accordance with the one or more embodiments of the present invention.

The terminology used herein is for the purpose of describing particular embodiments only and is not intended to be limiting of the invention. As used herein, the singular forms "a," "an" and "the" are intended to include the plural forms as well, unless the context clearly indicates otherwise. It will be further understood that the terms "comprises" and/or "comprising," when used in this specification, specify the presence of stated features, steps, operations, elements, and/or components, but do not preclude the presence or addition of another feature, step, operation, element, component, and/or group thereof.

At least one embodiment of the present invention may provide a beneficial effect such as, for example, identifying sources of ambiguity and generating test cases for testing the capability of NLIDB systems pertaining to ambiguity analysis in one or more ontologies, ambiguity analysis in Data, and/or ambiguity analysis in one or more vocabularies.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method, the method comprising steps of:
    identifying (i) one or more sources of ambiguity from input to a natural-language-interface-to-database system and (ii) at least one precondition corresponding to each of the one or more identified sources of ambiguity;
    generating one or more test cases which analyze one or more capabilities of the natural-language-interface-to-database system, wherein said generating the one or more test cases comprises determining validity of the at least one precondition corresponding to each of the one or more identified sources of ambiguity within the context of the one or more capabilities of the natural-language-interface-to-database system;
    automatically generating an ontology-dependent structured query template based at least in part on (i) the one or more generated test cases and (ii) an ontology associated with the natural-language-interface-to-database system;
    automatically generating one or more natural language queries based at least in part on (i) the ontology-dependent structured query template and (ii) contents of at least one database associated with the natural-language-interface-to-database system; and
    outputting, to at least one user, (i) the ontology-dependent structured query template and (ii) the one or more natural language queries;
    wherein the steps are carried out by at least one computing device.

2. The computer-implemented method of claim 1, wherein the input comprises schema input.

3. The computer-implemented method of claim 1, wherein the input comprises vocabulary input.

4. The computer-implemented method of claim 1, wherein the input comprises data input.

5. The computer-implemented method of claim 1, wherein the one or more capabilities of the natural-language-interface-to-database system comprises ambiguity analysis with respect to ontology.

6. The computer-implemented method of claim 1, wherein the one or more capabilities of the natural-language-interface-to-database system comprises ambiguity analysis with respect to data.

7. The computer-implemented method of claim 1, wherein the one or more capabilities of the natural-language-interface-to-database system comprises ambiguity analysis with respect to vocabulary.

8. The computer-implemented method of claim 1, wherein the one or more capabilities of the natural-language-interface-to-database system comprises query ambiguity analysis.

9. The computer-implemented method of claim 1, wherein the one or more capabilities of the natural-language-interface-to-database system comprises natural language query input analysis.

10. The computer-implemented method of claim 1, wherein the one or more capabilities of the natural-language-interface-to-database system comprises query meaning analysis.

11. The computer-implemented method of claim 1, comprising:
    instantiating one or more ontology element placeholders in the ontology-dependent structured query template with one or more ontology elements corresponding to the one or more identified sources of ambiguity.

12. The computer-implemented method of claim 1, wherein the ontology-dependent structured query template is database-type independent.

13. The computer-implemented method of claim 1, wherein each of the one or more natural language queries is database-type dependent.

14. A computer program product comprising a computer readable storage medium having program instructions embodied therewith, the program instructions executable by a computing device to cause the computing device to:
    identify (i) one or more sources of ambiguity from input to a natural-language-interface-to-database system and (ii) at least one precondition corresponding to each of the one or more identified sources of ambiguity;
    generate one or more test cases which analyze one or more capabilities of the natural-language-interface-to-database system, wherein said generating the one or more test cases comprises determining validity of the at least one precondition corresponding to each of the one or more identified sources of ambiguity within the context of the one or more capabilities of the natural-language-interface-to-database system;
    automatically generate an ontology-dependent structured query template based at least in part on (i) the one or more generated test cases and (ii) an ontology associated with the natural-language-interface-to-database system;

automatically generate one or more natural language queries based at least in part on (i) the ontology-dependent structured query template and (ii) contents of at least one database associated with the natural-language-interface-to-database system; and output, to at least one user, (i) the ontology-dependent structured query template and (ii) the one or more natural language queries.

15. The computer program product of claim 14, wherein the program instructions executable by a computing device further cause the computing device to:

instantiate one or more ontology element placeholders in the ontology-dependent structured query template with one or more ontology elements corresponding to the one or more identified sources of ambiguity.

16. The computer program product of claim 14, wherein the ontology-dependent structured query template is database-type independent.

17. The computer program product of claim 14, wherein each of the one or more natural language queries is database-type dependent.

18. A system comprising:

a memory; and at least one processor operably coupled to the memory and configured for:

identifying (i) one or more sources of ambiguity from input to a natural-language-interface-to-database system and (ii) at least one precondition corresponding to each of the one or more identified sources of ambiguity;

generating one or more test cases which analyze one or more capabilities of the natural-language-interface-to-database system, wherein said generating the one or more test cases comprises determining validity of the at least one precondition corresponding to each of the one or more identified sources of ambiguity within the context of the one or more capabilities of the natural-language-interface-to-database system;

automatically generating an ontology-dependent structured query template based at least in part on (i) the one or more generated test cases and (ii) an ontology associated with the natural-language-interface-to-database system;

automatically generating one or more natural language queries based at least in part on (i) the ontology-dependent structured query template and (ii) contents of at least one database associated with the natural-language-interface-to-database system; and outputting, to at least one user, (i) the ontology-dependent structured query template and (ii) the one or more natural language queries.

19. The system of claim 18, wherein the ontology-dependent structured query template is database-type independent, and wherein each of the one or more natural language queries is database-type dependent.

20. A computer-implemented method, the method comprising steps of:

identifying (i) one or more ambiguous queries from input to a natural-language-interface-to-database system and (ii) at least one precondition corresponding to each of the one or more ambiguous queries, wherein each precondition represents an instance wherein one or more portions of a phrase from an ambiguous query can be associated with multiple properties in an ontology associated with the natural-language-interface-to-database system;

generating one or more test cases which analyze one or more capabilities of the natural-language-interface-to-database system, wherein said generating the one or more test cases comprises determining validity of the at least one precondition corresponding to each of the one or more ambiguous queries within the context of the one or more capabilities of the natural-language-interface-to-database system;

automatically generating a database-type independent and ontology-dependent structured query template based at least in part on (i) the one or more generated test cases and (ii) the ontology associated with the natural-language-interface-to-database system;

automatically generating one or more database-type dependent natural language queries based at least in part on (i) the ontology-dependent structured query template and (ii) contents of at least one database associated with the natural-language-interface-to-database system; and outputting, to at least one user, (i) the database-type independent and ontology-dependent structured query template and (ii) the one or more database-type dependent natural language queries;

wherein the steps are carried out by at least one computing device.

* * * * *